(No Model.)
W. H. HANSELL.
ELLIPTIC SPRING.
No. 525,600.  Patented Sept. 4, 1894.
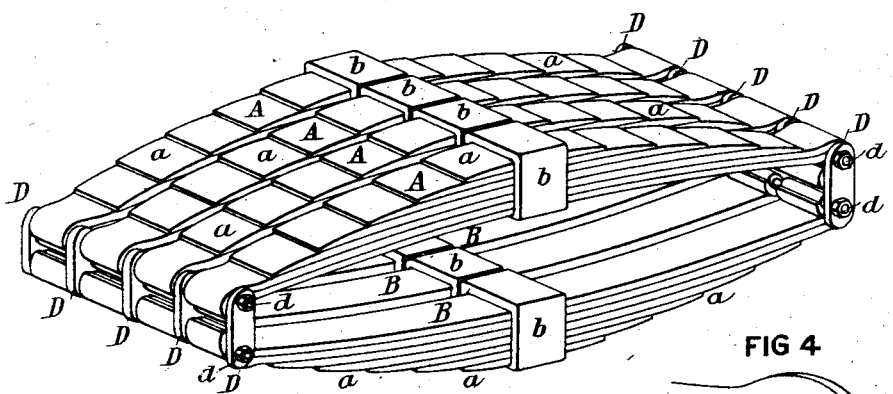
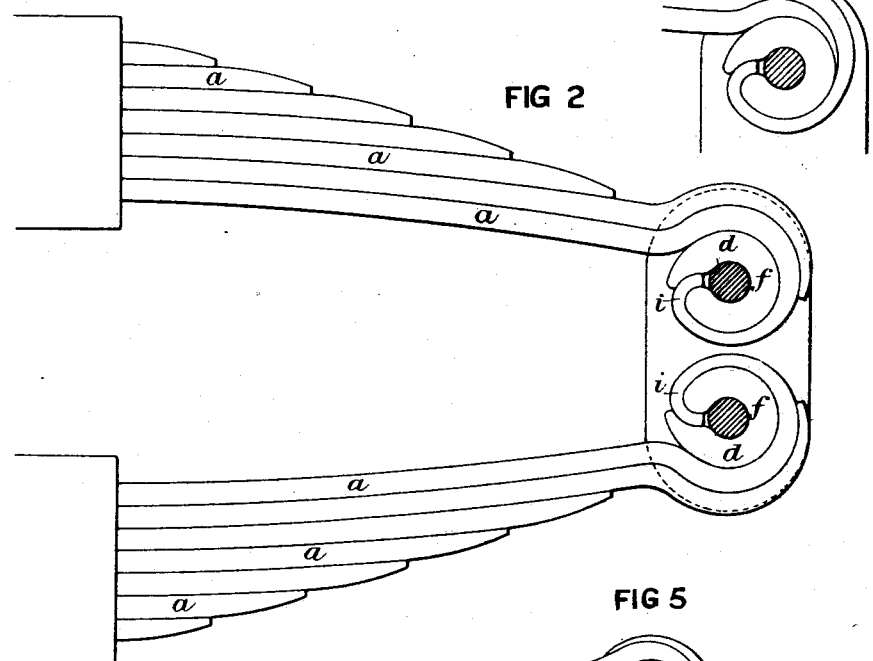
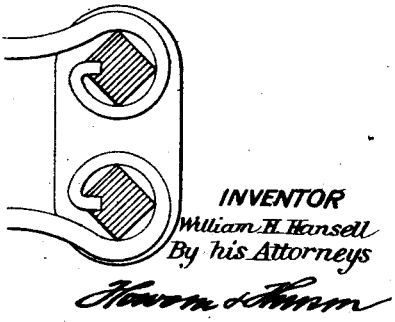
WITNESSES
R. Schleicher
Frank Bechtold
INVENTOR
William H. Hansell
By his Attorneys

UNITED STATES PATENT OFFICE.

WILLIAM H. HANSELL, OF PHILADELPHIA, PENNSYLVANIA, ASSIGNOR TO THE CHARLES SCOTT SPRING COMPANY, OF SAME PLACE.

ELLIPTIC SPRING.

SPECIFICATION forming part of Letters Patent No. 525,600, dated September 4, 1894.

Application filed March 27, 1894. Serial No. 505,300. (No model.)

*To all whom it may concern:*

Be it known that I, WILLIAM H. HANSELL, a citizen of the United States, residing in Philadelphia, Pennsylvania, have invented certain Improvements in Springs, of which the following is a specification.

The object of my invention is to so construct an elliptic spring that its upper and lower halves shall assume a nearly parallel position when loaded in service. This object I attain by means of an arrangement of connecting devices applied to the eyes at the ends of the springs, which devices also prevent any possibility of lateral slipping or of forward or backward movement of one-half of the spring with respect to the other. In effect the two parts of the spring are locked to the connecting devices so far as regards these motions and yet are perfectly free to move as the spring is compressed or released.

In the accompanying drawings: Figure 1, is a perspective view of a four-set spring constructed in accordance with my invention. Fig. 2, is an enlarged view of one end of the spring illustrating the means employed for locking the upper and lower parts of the spring to the connecting device. Fig. 3, is a perspective view of one of the connecting devices detached from the spring; and Figs. 4 and 5, are views illustrating modifications of the invention.

In Fig. 1, A represents the upper, and B the lower parts of the spring, each of which is composed of a number of overlapping leaves $a$ of different lengths confined together in the center by means of a strap or band $b$ in the ordinary way. At each end of the spring are plates D, D', D², &c., connected by means of bolts $d$ passing through the successive plates and through eyes formed at the ends of the upper and lower halves of each spring, said plates D being of such length as to effect the desired separation of the springs at the ends in order that the upper and lower halves of the spring shall assume a parallel or nearly parallel position when loaded in service. When the ends of the spring are separated in this way, however, some means must be resorted to for preventing the upper and lower halves of the spring from moving longitudinally in respect to each other after the manner of the two parts of a parallel rule, and yet should be free to be compressed or released. I therefore secure to each of the plates D, D', D² and D³ a pair of projecting bearing studs $f$ provided with central openings for the reception of bolts $d$, and adapted exteriorly to receive the curved portions or partial eyes formed at the ends of the innermost leaves of the springs, the extreme end $i$ of each leaf being hooked or bent for adaptation to a slot or pocket $m$ formed in the bearing stud, as shown in Fig. 3. The end plate D⁴ is a simple flat plate. By this means the ends of the inner leaves of the spring are confined to the studs $f$ and any lateral movement of one-half of the spring independently of the other is effectually prevented, while at the same time, free movement of the spring in compression or release is permitted. Although I prefer to connect the inner leaf of each spring to the stud of the connecting plate, one of the other leaves of the spring may be thus connected if desired without departing from the essential feature of my invention, for instance, in Fig. 4 I have shown the second leaf of the spring overlapping the main leaf and connected to the stud. The studs themselves may be dispensed with if the connecting bolt is sufficiently large to permit of the formation of a slot or pocket therein, and is prevented from turning, thus, in Fig. 5 I have shown a construction in which a notched bolt $d'$ is engaged by the hooked end of the inner leaf of the spring the turning of the bolt being prevented by making these portions of the same which enter the plates D D' of square or other equivalent cross sectional form.

Although I have shown my invention as applied to a "four set" spring, it will be evident that it can be used in connection with a single pair of springs, or with a set comprising any desired number of springs.

I am aware that it has been proposed to separate the upper and lower halves of an elliptic spring at the ends, so that the two halves of the spring would be straight or substantially so, when under load, but in such prior structures, the eyes at the ends of the springs were simply adapted to ordinary bolts, and an independent central spring was required in order to keep the upper and lower halves of the spring in place, the structure being inoperative in the absence of such central spring, whereas the construction which I have devised, involving the locking of the upper and lower halves of the springs to the separating devices, renders the use of such independent central spring unnecessary.

Having thus described my invention, I claim, and desire to secure by Letters Patent—

1. An elliptic spring composed of upper and lower halves, provided with separating devices at the ends, said upper and lower halves locked to such separating devices, whereby longitudinal movement of one half of the spring in respect to the other half is prevented, substantially as described.

2. The combination of the upper and lower halves of an elliptic spring, with spacing plates at the ends of the spring, independent connections between said spacing plates and the two halves of the spring, and means for locking one of the leaves of each half of the spring to its corresponding connection, substantially as specified.

3. The combination of the upper and lower halves of the spring, with the spacing plates having projecting bearing studs with pockets on their inner sides, a leaf of each half of the spring being coiled around its bearing stud and having a hooked end adapted to the pocket in said stud, substantially as specified.

In testimony whereof I have signed my name to this specification in the presence of two subscribing witnesses.

WILLIAM H. HANSELL.

Witnesses:
FRANK BECHTOLD,
JOSEPH H. KLEIN.